(12) United States Patent
Basic et al.

(10) Patent No.: US 7,598,713 B2
(45) Date of Patent: Oct. 6, 2009

(54) SYSTEM AND METHOD FOR ELECTRIC CURRENT AND POWER MONITOR AND CONTROL OF A GENERATOR

(75) Inventors: Nisvet Basic, Chicago, IL (US); Ciaran Patterson, Chicago, IL (US); Mahmood Pourkermani, Wilmette, IL (US)

(73) Assignee: C.E. Niehoff & Co., Evanston, IL (US)

( * ) Notice: Subject to any disclaimer, the term of this patent is extended or adjusted under 35 U.S.C. 154(b) by 0 days.

(21) Appl. No.: 12/288,779

(22) Filed: Oct. 22, 2008

(65) Prior Publication Data
US 2009/0058207 A1 Mar. 5, 2009

Related U.S. Application Data

(62) Division of application No. 11/607,773, filed on Dec. 1, 2006, now Pat. No. 7,466,107.

(51) Int. Cl.
*H02P 9/02* (2006.01)
*H02H 7/06* (2006.01)

(52) U.S. Cl. .......................... 322/37; 322/28
(58) Field of Classification Search .......... 322/22, 322/23, 25, 28, 37, 99
See application file for complete search history.

(56) References Cited

U.S. PATENT DOCUMENTS

| | | | |
|---|---|---|---|
| 4,659,977 A | 4/1987 | Kissel et al. | |
| 4,839,575 A | 6/1989 | MacFarlane | |
| 5,087,881 A | 2/1992 | Peacock | |
| 5,216,350 A | 6/1993 | Judge et al. | |
| 5,670,070 A | 9/1997 | Clark et al. | |
| 5,724,932 A | 3/1998 | Antone | |
| 6,064,186 A | 5/2000 | Pierret et al. | |
| 6,184,661 B1 | 2/2001 | Becker et al. | |
| 6,208,931 B1 * | 3/2001 | Schoettle et al. | 701/115 |
| 6,417,650 B1 | 7/2002 | Stefanovic et al. | |
| 6,534,959 B1 * | 3/2003 | Anderson et al. | 322/28 |
| 7,019,495 B2 * | 3/2006 | Patterson | 322/7 |
| 7,466,107 B2 * | 12/2008 | Basic et al. | 322/28 |
| 2005/0104562 A1 * | 5/2005 | Hatz et al. | 322/28 |
| 2008/0133064 A1 * | 6/2008 | Basic et al. | 700/287 |
| 2009/0051332 A1 * | 2/2009 | Basic et al. | 322/29 |
| 2009/0079400 A1 * | 3/2009 | Basic et al. | 322/99 |

* cited by examiner

*Primary Examiner*—Nicholas Ponomarenko
(74) *Attorney, Agent, or Firm*—Law Offices of Michael M. Ahmadshahi

(57) ABSTRACT

A control device measures a voltage drop across a conductor in a generator to determine and control the total generator output current. A temperature of the conductor is also measured to improve the accuracy. The control device may further improve on the accuracy by compensating for the electrical current through a field coil that may power the generator. The control device may be used in combination with a generator in a vehicle electrical system. Other system parameters may be monitored to improve on the system monitoring, diagnostics, and control. The generator may include a conductor comprising a process-controlled geometric shape.

6 Claims, 12 Drawing Sheets

US 7,598,713 B2

SYSTEM AND METHOD FOR ELECTRIC CURRENT AND POWER MONITOR AND CONTROL OF A GENERATOR

CROSS REFERENCE TO RELATED APPLICATIONS

The present patent application is a division of a non-provisional patent application entitled "SYSTEM AND METHOD FOR ELECTRIC CURRENT AND POWER MONITORING AND CONTROL OF A GENERATOR," filed Dec. 1, 2006 now U.S. Pat. No. 7,466,107, as U.S. patent application Ser. No. 11/607,773 by the same inventors. This patent application claims the benefit of the filing date of the cited non-provisional patent application according to the statutes and rules governing non-provisional patent applications, particularly 35 USC §§120, 121, and 37 CFR §1.78. The specification and drawings of the cited non-provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a control device for a generator, including a system and method, wherein the control device uses a conductor embedded in the generator to measure the total generator output current and operates to limit and/or cease the output current according to said measurement. The control device may be used in conjunction with the generator for improved monitoring, diagnostics, and control functions. This invention further relates to a generator incorporating a conductor which comprises a process-controlled geometric shape.

BACKGROUND

The present invention relates to a control device for a generator wherein the control device uses a conductor, such as a wire, embedded in the generator to control the output power of the generator. The control device monitors an electrical potential across the conductor in determining the total generator output current. The control device is configured to limit and/or cease the generator output power when the electrical potential is within a predetermined range and/or above a predetermined value. Where temperature variation of the conductor is substantial, the control device may be configured to measure the temperature of the conductor to compensate for the temperature variation. A sensor can be positioned within the generator in specific locations to measure either directly, indirectly, or by inference, the conductor temperature. Where the generator uses a field coil whose electrical current is supplied by the generator, the control device may further be configured to measure the field current and subtract it from the total generator output current. The control device can be further configured to monitor other parameters, as will be discussed below, to improve the generator functionality.

The present invention further relates to a generator incorporating process-controlled conductors which may be utilized to determine the total generator output current. The generator comprises one or more such conductors which carry a portion or all of the total electrical current generated by the generator. The conductors are made of a specific shape during the manufacture of the generator, allowing accurate determination of the total generator output current without the need for additional sensors. Specifically, the length and/or diameter of the conductors are kept within a specific tolerance range. The control device may be used with a generator incorporating either an ordinary or a process-controlled conductor for its operation.

Modern vehicles incorporate complex electronics and electrical equipment in their construction. Such electrical equipment include generators and energy storage devices such as batteries. A generator is used to power the vehicle's electrical system and to recharge the battery. The battery is used to power the electrical system when the vehicle engine is not operating or when the generator can not produce sufficient electrical power. Ordinarily, the generator includes a voltage regulator that maintains the generator voltage at a regulation voltage. Modern generators include a control device that, in addition to regulating the generator voltage, operates to monitor the generator performance in relation with the vehicle electrical and mechanical system. See, for instance, Becker et al., U.S. Pat. No. 6,184,661, incorporated herein in its entirety, where the control device operates to limit the generator output power in order to protect the engine from excessive generator torque, and Jabaji, U.S. Pat. No. 5,907,233, incorporated herein in its entirety, where the control device monitors the AC signal generated by the stator windings and, in the absence of the AC signal, removes the field coil current in order to protect the battery from excessive drain. Because the generator is an essential if not the only source of electrical power within the vehicle electrical system, a control device that purports to control the generator operation in relation to the vehicle's electrical and mechanical system must be able to sense the generator output current.

Generator output current can be obtained by different methods. Two widely used sensors for current measurement, known to skilled artisans, are the current shunt resistor and Hall Effect sensor. The former is typically used to measure currents in the order of 10's of Amperes while the latter is preferred when the current is in the order of 100's of Amperes due to the need to minimize power dissipation in the measurement device. The simpler more economic method is the current shunt resistor method which involves placing the shunt in the path of the output current and measuring the voltage across the shunt. The shunt must be sufficiently low in resistance to avoid significant alteration of the output current it is to measure. Additionally, temperature variation of the shunt must be taken into consideration when measuring the voltage across the shunt. This is because the shunt resistance varies with temperature. Such temperature variations are caused either by the ambient temperature variations or heat generated by resistive loss as current passes through the shunt.

Current shunt resistors are made up of different materials, depending on the application. They typically have two leads which are made up of copper or copper alloys, and an encapsulation which is made up of ceramic or silicon compounds. A current shunt resistor, incorporated in a generator in a vehicle, is exposed to high levels of shock and vibration which may cause the shunt to fail. Due to the brittle nature of the materials used in the construction of the shunt resistor, they are prone to fatigue failures. In particular, shunt resistors may develop cracks due to the shock and vibration. When a crack develops, the shunt resistor may become either completely severed or, alternatively, its resistance may become extremely high. In either event the shunt fails and generator output may cease.

A shunt resistor further introduces an external element to the generator assembly. Shunt resistors that can withstand high currents that are in the order of 100's of amperes are typically large in size. This is because any shunt resistor used in a generator must have a very low voltage drop to minimize the resistive power loss. Incorporating a large shunt resistor within a generator assembly makes the generator larger and heavier than it would otherwise be, which is undesirable as vehicle manufacturers seek lighter and smaller accessories.

An internal conductor inherent in the generator assembly and capable of carrying electrical current substantially proportional to the total generator output current may be advantageously utilized as a shunt resistor provided that the conductor shape is well controlled during the manufacturing process. This is because the resistance of the conductor is proportional to its shape. A typical generator comprises stator windings that produce the generator output current via a varying magnetic field. Multi-phase generators have multiple stator windings that are connected via Δ (delta) or Y arrangement, known to skilled artisans. Each phase carries a proportional amount of the total generator output current. For instance in a 3-phase generator, each phase carries approximately ⅓ of the total generator output current, assuming the phase windings are identical. In the manufacture of a typical generator, a conductor, such as a wire, is used to connect a phase to an output terminal. For DC generators, each phase is coupled to a pair of rectifying diodes to convert the AC output to a DC output. The conductor may be positioned between the phase and the output terminal for an AC generator, and between either, the phase winding and the corresponding diode pair, or between the diode pair and the output terminal for DC generators.

The conductor shape, i.e. cross section and length, are determined according to the generator output current rating and design. Most manufacturers designate a particular cross section or wire gage to be used for the generator wiring,. The length of the conductor is designated by design, but may be trimmed during assembly. The trimming occurs because during assembly of a multi-component generator the conductor routing is not controlled with a high precision. However, if such routing is controlled, there will be no need to trim the conductor during assembly and the conductor length in the generator may be controlled with a high level of accuracy. Since, as mentioned before, the resistance of the conductor is directly proportional to its length, the conductor can serve as a shunt resistor whose electrical potential can be measured with a high level of precision. Furthermore, since such conductors are made up of stranded wires, they are extremely flexible and resistant to shock and vibration. Therefore, incorporating one or more such conductors in a generator makes accurate measurement of the total generator output current possible without the need for a conventional shunt or Hall effect device.

As mentioned above, generators produce electrical power via their phase windings. In a multi-phase generator, the total electrical power generated by the generator is the sum of the electrical power generated by the individual phase windings. Thus, the total generator output current may be measured by measuring the electrical potential across individual conductors and summing the result. However, as will be demonstrated below in the detailed description of the preferred embodiments, only one conductor coupled with a phase winding may be used to measure the total generator output current. This is possible by calibrating the conductor's electrical potential at various generator output current and correlating the result to the total generator output current.

Accurate measurement of the total generator electrical power must take into account the conductor's temperature variation. A direct measurement of the conductor temperature is possible by placing a temperature sensor in close proximity to the conductor. Where direct measurement of the conductor temperature is impractical, an indirect measurement can be achieved by measuring the temperature of certain other components and correlating between the components' temperatures and that of the conductor's. For instance, the temperature of the conductor can be accurately estimated by measuring the temperature of the generator's control device/voltage-regulator or the generator's field coil. In the latter case, a sensor capable of measuring the resistance variation of the field coil can be used to infer the temperature of the conductor.

A generator in a vehicle electrical system converts the vehicle's engine's mechanical power into electrical power. The generator provides the electrical power to electrical loads and batteries in the vehicle. A control device manages the electrical power distribution to the loads and batteries. The control device's primary task is to control the output power of the generator. This can be achieved by controlling the generator output current and voltage. Conventional generators, however, do not control the output power. They control the output voltage by simply maintaining it at a regulation voltage, hence their names, voltage regulators. For these generators, the output current is a function of the electrical current demand by the electrical loads and/or the batteries without any limitation other than the maximum available current at the corresponding rotational speed (RPM). Modern generators, such as those disclosed in Becker et al., control the output current in relation to other components in the vehicle, such as certain vehicle operating conditions or engine drive limitations. To control the output current or electric power, the control device must directly or indirectly measure the output current. A generator equipped with one or more conductors provides the generator's control device a simple, economical, and efficient way to directly measure the generator's output current without the need for additional sensors.

A generator's control of the output current can be a function of the generator's performance and those of other components within the vehicle electrical and mechanical system. For instance, a generator's output current may be limited or ceased based on the temperature of the generator's output terminal. An excessive temperature of the output terminal may be an indication of a loose cable connecting the generator to the battery. Other parameters, as discussed more thoroughly below, may be important in controlling the output voltage and/or output current. Such parameters include battery temperature, battery type, battery voltage, and the ratio between the RPMs of the engine and generator.

Modern vehicles monitor the electronics and electrical equipment in the vehicle electrical system to improve system performance. For instance, a vehicle electrical engine control device may monitor the vehicle engine operating conditions and manipulate the generator output power in relation to the operating conditions. A generator equipped with a control device that is capable of acquiring system information can complement such vehicle's electrical system and improve the vehicle's performance. For instance, a generator control device that can gather data from other components whose performance affect the generator itself can exchange the acquired data with the vehicle electrical system including the vehicle's computer network for a more efficient control.

Additionally, a generator control device that can alter the generator's performance as a function of the acquired data can further assist the other components in the vehicle to perform their tasks more efficiently.

Although various systems have been proposed which touch upon some aspects of the above problems, they do not provide solutions to the existing limitations in providing a simple, economical, and efficient means to measure the total output current of a generator, and to control its output current in relation to other components in the electrical system. In all the various systems, an external sensor is used to measure the generator output current and in none of the proposed systems is the output current control as comprehensive as the present invention.

For example, the Antone patent, U.S. Pat. No. 5,724,932, discloses an alternating current control apparatus and method for glow plugs that controls the output current of an alternator, in relation to the current demand by the glow plugs, to improve the glow plugs longevity. The apparatus uses an external current sensor to measure the alternator output current. In Clark et al., U.S. Pat. No. 5,670,070, the disclosure describes a method and system for controlling the output current of a three-phase alternator used in a welding apparatus. The alternator output current is controlled in response to a desired fixed slope operating current/voltage characteristic curve. This invention involves utilizing an external shunt resistor to measure the alternator's output current. In Judge et al., U.S. Pat. No. 5,216,350, a method and system for controlling an alternator is disclosed. The control system includes an alternator, battery, and various electrical loads. The output current of the alternator is controlled when there is excessive current demand by the electrical loads. The control system uses an external current sensor to measure the alternator output current. The MacFarlane patent, U.S. Pat. No. 4,839,575, discloses a voltage regulator for an alternator that monitors and limits the alternator's output current. The output current is measured via a current level sensor, an external element with the disadvantages as discussed above. In all of these systems, the generator's output current is sensed via an external sensor whereas the generator of the present invention includes a process-controlled conductor that is part of conventional internal generator wiring and may be implemented in the ordinary course of manufacturing the generator. In addition, the control device of the present invention controls the generator output current in response to a comprehensive group of system components affecting the system performance.

Generators convert mechanical power into electrical power for use by electrical loads. For instance, in a vehicle electrical system a generator supplies electrical power to the vehicle electrical loads as well as the battery. Control of the electrical power generated by the generator is essential in the electrical system to ensure proper system performance. Accurate determination of the electrical power involves accurate determination of both the electrical current and voltage. Therefore, it is desirable to construct a generator, utilizing process-controlled conductors, that is capable of providing a means for measuring its total output current in a simple, economical, and efficient manner. It is further desirable to include a control device that is capable of measuring the total generator output current and limiting and/or ceasing the generator output power in response to the measured output current as well as a host of other parameters associated with the components within the electrical system.

SUMMARY

The present invention discloses a control device, including a system and method, which may be used in combination with a generator to measure and control the total generator output current and/or system components within the electrical system. The system comprises a generator that includes a conductor capable of providing a signal indicative of an electrical potential across the conductor and substantially proportional to the total generator output current, and a control device capable of limiting and/or ceasing the generator output current in response to the signal. Preferably, the control device limits the output current when the electrical potential across the conductor is within a predetermined range, and ceases the generator output current when the electrical potential is above a predetermined value. The control device is further capable of limiting and or ceasing the generator output current in response to the electrical potential as well as the temperature variation of the conductor. The control device may further be configured to limit and/or cease the generator output current further in response to the generator's field coil current, temperature of the generator's output terminal, and ratio between the engine and generator RPMs. The control device may also be further configured to regulate the generator output voltage based on the voltage sensed at the generator output terminal or the battery. Where temperature variation is substantial, the control device may further be configured to compensate said regulation voltage based on the temperature variation. The control device may further be configured to temperature-compensate the regulation voltage based on battery type. The control device may also be used to determine a first and second value for the total generator output current and to generate an error signal when the difference between said first and second values is above a predetermined value.

In one aspect, a vehicle electrical system is disclosed comprising a generator that includes a conductor, and a control device that measures an electrical potential across the conductor and limits and/or ceases the total electrical output current generated by the generator according to the measured electrical potential. Preferably, the control device limits the total electrical output current when the electrical potential is within a predetermined range, for instance $V_1$ and $V_2$, and ceases said output current when the electrical potential is greater than $V_2$.

In another aspect, a vehicle electrical system is disclosed comprising a generator that includes a conductor, and a control device that measures an electrical potential across the conductor and limits and/or ceases the total electrical output current generated by the generator according to the measured electrical potential. Where temperature variations of the conductor is substantial, the generator further comprises means to generate a temperature signal indicative of the conductor temperature and the control device is further configured to measure the temperature signal and limit and/or cease the total electrical output current according to at least one of the electrical potential and conductor temperature.

In another aspect, a vehicle electrical system is disclosed comprising a generator that includes a conductor, and a control device that measures an electrical potential across the conductor and limits and/or ceases the total electrical output current generated by the generator according to the measured electrical potential. Where the generator further comprises means to generate a signal indicative of electrical current through the generator field coil, the control device may be further configured to measure the field current signal and limit and/or cease the total electrical output current according to at least one of the electrical potential and field current.

In another aspect, a vehicle electrical system is disclosed comprising a generator that includes a conductor, and a control device that measures an electrical potential across the conductor and limits and/or ceases the total electrical output current generated by the generator according to the measured electrical potential. Where the generator further comprises means to generate a signal indicative of the temperature of the generator output terminal, the control device may be further configured to measure the temperature signal and limit and/or cease the total electrical output current according to at least one of the electrical potential and output terminal temperature.

In another aspect, a vehicle electrical system is disclosed comprising a generator that includes a conductor, and a control device that measures an electrical potential across the conductor and limits and/or ceases the total electrical output current generated by the generator according to the measured electrical potential. Where the generator further comprises means to generate a signal indicative of the generator output voltage, the control device may be further configured to measure the output voltage and regulate said output voltage. Where the system further comprises means to generate a signal indicative of the temperature of a battery included in the system, the control device may be further configured to regulate the output voltage according to at least one of the output voltage and battery temperature. Where the system further comprises means to generate a signal indicative of the battery type, the control device may be further configured to regulate the output voltage according to at least one of the output voltage, battery temperature, and battery type. Preferably, the control device is configured to regulate the generator output voltage at a regulation voltage that is a function of the battery type and temperature. Where the system further comprises means to generate a signal indicative of the battery voltage, the control device may be further configured to measure the battery voltage and regulate the generator output voltage according to at least one of the generator output voltage and battery output voltage.

In another aspect, a vehicle electrical system is disclosed comprising means to generate signals indicative of the RPM of an engine and generator included in the vehicle electrical system, and a control device that measures the RPM signals and limits and/or ceases the total electrical output current generated by the generator according to the measured RPM signals. Preferably, the control device is configured to limit and/or cease the total electrical output current or, alternatively, generate an error signal indicative of a fault condition, when a ratio of the RPMs differs from a predetermined value.

In another aspect, a vehicle electrical system is disclosed comprising a generator that includes a conductor, and a control device that measures an electrical potential across the conductor and limits and/or ceases the total electrical output current generated by the generator according to the measured electrical potential. Where the system further comprises means to generate signals indicative of the temperature of the conductor, electric current through the field coil, and generator RPM, the control device may be configured to obtain a first and second values of the total generator output current according to the signals and generate an error signal indicative of a fault condition when the two values differ by a predetermined value.

In another aspect, a control device for a generator is disclosed, wherein the generator comprises a conductor operative to generate a first signal indicative of an electrical potential that is substantially proportional to the total electrical output current generated by the generator, said control device comprising a processor, including a programmable code, capable of measuring the electrical potential and operative to limit and/or cease the total electrical output current by applying a control signal to the generator output power controller according to the first signal. The control device may be further configured to measure other parameters, as discussed above, via additional lines, to limit and/or cease the total electrical output current according to the electrical potential across the conductor and the other parameters. In one instance, the control device may be further configured to regulate the generator output voltage.

In another aspect, a method for controlling a vehicle electrical system that includes a generator is disclosed. The method, comprises generating a signal via a conductor included in the generator wherein the signal is indicative of an electrical potential across the conductor and wherein a total electrical output current generated by the generator is substantially proportional to the electrical potential, and limiting and/or ceasing the total electrical output current according to the signal. The method may further comprise generating signals indicative of other parameters, as discussed above, and limiting and/or ceasing the total electrical output current accordingly.

The present invention also discloses a generator incorporating one or more process-controlled conductors, each capable of generating a signal indicative of an electrical potential across the conductor and substantially proportional to the total generator output current. Preferably, the process-controlled conductor is of a specific length and/or cross section. Where temperature variation is substantial, the generator may include a sensor to directly, indirectly, or by inference measure the temperature variation to compensate for changes in the conductor's resistance. Where the generator includes a field coil that is coupled with and draws electrical current from the generator, the electrical current is measured, either directly or indirectly, and the total generator electrical output current is compensated accordingly.

In one aspect, a generator is disclosed comprising a conductor, said conductor comprising a process-controlled geometric shape capable of generating a signal indicative of an electrical potential across the conductor that is proportional to the total output current generated by the generator. Preferably, the process-controlled geometric shape includes a specific length and cross section. In one instance, the conductor length is specified within a tolerance range of less than or equal to 1/100 of an inch, and the cross section is specified by a specific wire gage. In one instance, the conductor is disposed between a rectifying diode and an output terminal.

In another aspect, a generator is disclosed comprising a conductor, said conductor comprising a process-controlled geometric shape capable of generating a signal indicative of an electrical potential across the conductor that is proportional to the total output current generated by the generator. Where temperature variation of the conductor is substantial, a sensor is included in the generator to directly, indirectly, or by inference measure the temperature variation so that the changes in conductor resistance, hence the electrical potential, may be temperature compensated. Preferably, the sensor is disposed near or in contact with the conductor so that a direct temperature measurement may be obtained. In one instance, the conductor temperature may be obtained indirectly by measuring the temperature of a voltage regulator/controller that is mounted on the generator and correlating said voltage regulator/controller temperature to the temperature of the conductor. In another instance, an indirect measurement of the conductor temperature may be obtained by measuring the exit temperature of the airflow through the generator and correlating the airflow temperature to the conductor temperature. In yet another instance, the temperature of the conductor may be indirectly obtained by measuring the temperature of the generator field coil and correlating the field coil temperature to the conductor temperature. The conductor temperature may be inferred by utilizing a sensor capable of measuring the field coil resistance, obtaining the field coil temperature from its resistance, and correlating the field coil temperature to the conductor temperature.

In another aspect, a generator is disclosed comprising a conductor, said conductor comprising a process-controlled geometric shape capable of generating a signal indicative of an electrical potential across the conductor that is proportional to the total output current generated by the generator. Where the generator field coil draws electrical current from the generator, a sensor is included in the generator to measure directly or indirectly the field current so that the total output current may be compensated accordingly. Preferably, the sensor directly measures the field current. In one instance, the field current maybe obtained indirectly by a sensor capable of measuring the duty cycle of the voltage across the field coil and correlating the duty cycle to the field current.

In another aspect, a method is disclosed for determining a total electrical output current of a generator by incorporating in the generator a conductor having a process-controlled geometric shape. The method comprises generating a signal, via the conductor, which is indicative of an electrical potential across the conductor and wherein the total electrical output current is substantially proportional to the electrical potential.

DETAILED DESCRIPTION OF THE PRESENTLY PREFERRED EMBODIMENTS

Figure 1:
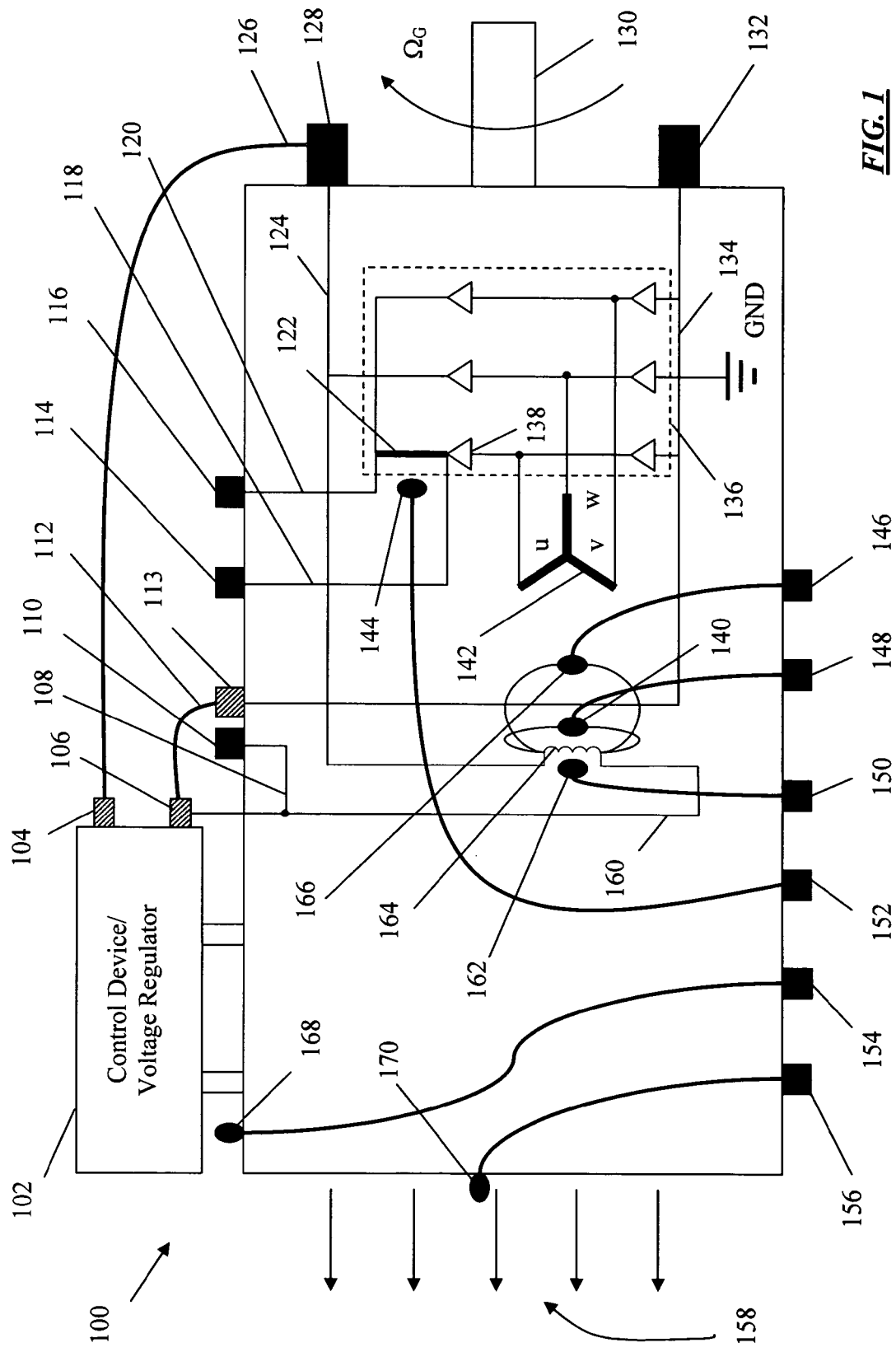
FIG. 1 shows a schematic diagram of a generator including a conductor having a process-controlled geometric shape according to a preferred embodiment.

FIG. 1 depicts a schematic diagram of a preferred embodiment of a generator 100, including a conductor 122 comprising a process-controlled geometric shape whereby an electrical potential across said conductor may be obtained via a first and second terminals 114 and 116, respectively. The generator 100 further comprises a field coil 164 and a three-phase stator 142 coupled with a rectifier diode assembly 136. The conductor 122 is disposed between a rectifier diode 138 and a generator output terminal 128. The generator 100 further includes a sensor 144 in proximity to or in contact with the conductor 122 whereby the sensor 144 generates a signal proportional to the temperature of the conductor 122, which signal is available via a terminal 152.

The generator 100 further includes a sensor 168 which may be positioned in proximity to or in the interior of a control device/voltage regulator 102. The sensor 168 is capable of generating a signal indicative of the temperature of the control device/voltage regulator 102 which may be accessed through a terminal 154. According to this preferred embodiment, the control device/voltage regulator 102 is a control device that controls the total electrical output current of the generator 100 in addition to regulating its output voltage. (See below for detailed description of the control device). However, the sensor 168 may be positioned as such with respect to any other component mounted on the generator 100. The generator 100 further comprises a sensor 170 capable of generating a signal accessible through a terminal 156, said signal is proportional to the temperature of the exhaust air 158 through the generator 100. The exhaust air 158 is generated by the rotation of a fan (not shown) mounted on a generator shaft 130 at an angular speed of $\Omega_G$. A sensor 162 is further included in the generator 100 capable of generating a signal proportional to the temperature of a field coil 164, which signal is available via a terminal 150. The sensors 168, 170, and 162 provide temperatures of selected components within the generator 100 whose temperatures are related to the temperature of the conductor 122. Hence, the sensors 168, 170, and 162 are means to obtain, indirectly, the temperature of the conductor 122 whereas the sensor 144 provides a direct measurement of the conductor temperature.

The temperature of the conductor 122 may be inferred from the changes in resistance of the field coil 164 due to temperature variations. Thus, sensor 140 is coupled to the field coil 164 and it generates a signal proportional to the changes in its resistance which is related to the temperature of the field coil 164 which in turn is related to the temperature of the conductor 122. This signal is available via a terminal 148.

The electrical current through the field coil 164 may be measured directly via a sensor 166 capable of generating a signal proportional the electrical current. This signal may be available via a terminal 146. An alternative means to determine the field current indirectly is to measure the duty cycle of the field coil 164 via a terminal 110. In this embodiment, the field coil 164 is, at one end, connected to the generator output (B+) terminal 128, and to the generator ground (B−) terminal 132, at the other end. According to one embodiment, the control device 102 operates to further regulate the generator output voltage at a regulation voltage. This is achieved by switching the negative side of the field coil 164. Thus, the control device/voltage regulator 102 of the present embodiment is connected to the ground terminal 132 via terminals 113 and 106 and terminal 110 may be used to measure the duty cycle of the field current. This duty cycle is used to determine the field current.

Figures 2A, 2B:
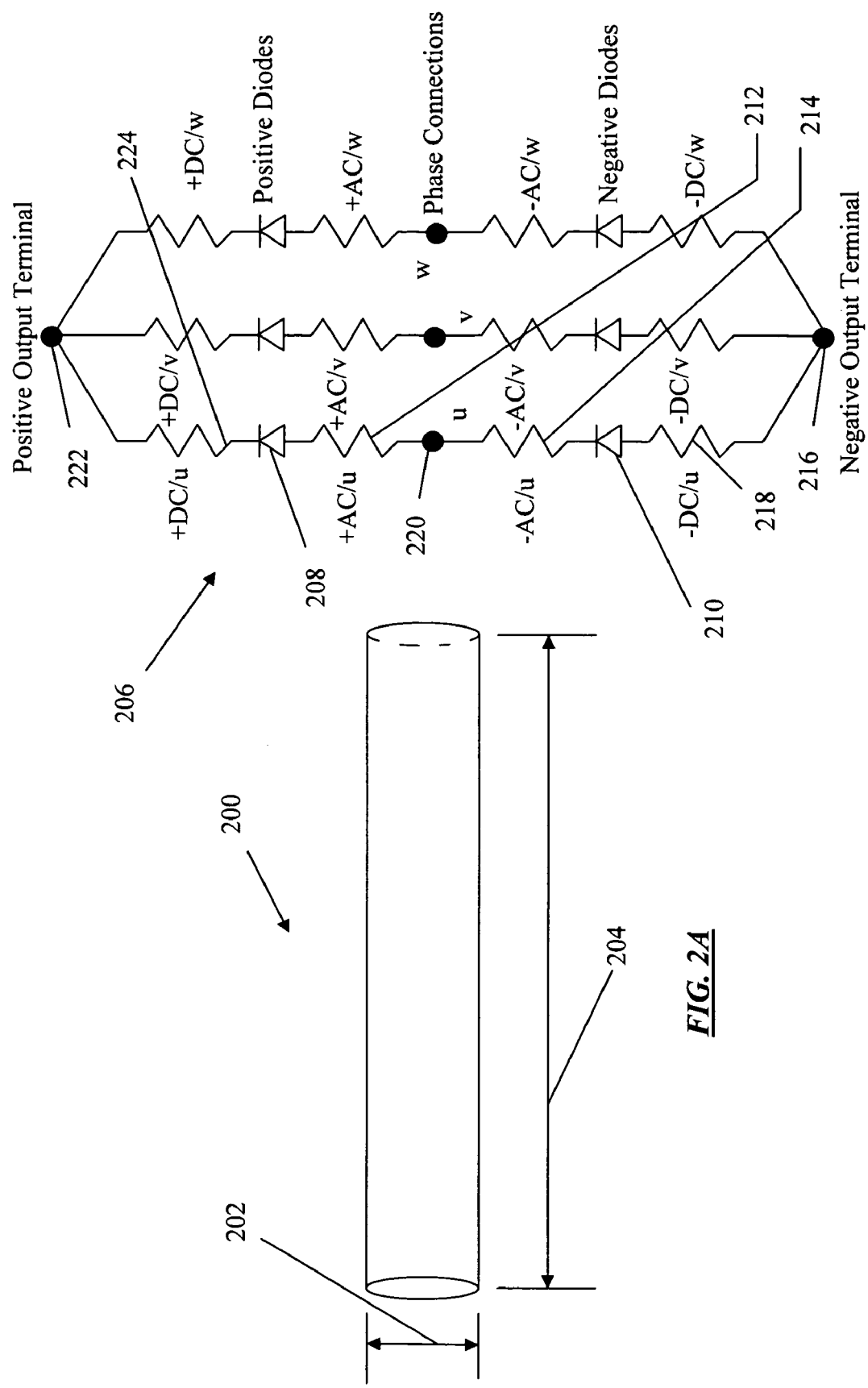
FIG. 2A shows a schematic diagram of conductor comprising a process-controlled geometric shape included in the generator of FIG. 1.
FIG. 2B shows a schematic diagram of a three-phase rectifier diode assembly utilizing the conductor of FIG. 2A according to a preferred embodiment.

FIG. 2A shows a schematic diagram of conductor 200 comprising a process-controlled geometric shape. This conductor may be included in the generator 100 of FIG. 1. The conductor 200 is a wire used to deliver electrical current and can operate in lieu of a shunt resistor to determine the total generator output. The resistance of the conductor 200 is a function of its length and diameter, as well as its temperature. Assuming constant diameter and temperature, the resistance of the conductor 200 may be defined with a high precision by maintaining its length within a tight tolerance range. Since the resistance varies linearly with length, accuracy of less than or equal to 1% would require a tolerance range of one tenth of an inch for a ten inch wire. Other tolerance ranges could be applied according to the accuracy required. Where temperature variations are significant, a temperature sensor of the kind discussed above may be used to compensate for the temperature variation. The diameter of the conductor 200 is also defined with a high precision by designating a specific wire gage in the manufacturing process. Thus, the conductor 200 that is used in the ordinary course of manufacturing a generator may also be used in lieu of a shunt resistor, eliminating a need for an external shunt. Also, as discussed above, the conductor 200 is flexible making it ideal for applications where the generator is exposed to high levels of shock and vibration.

FIG. 2B shows a schematic diagram of a three-phase rectifier diode assembly utilizing the conductor of FIG. 2A. According to a preferred embodiment, the conductor 200 is disposed between a positive diode 208 and a positive output terminal 222 at 224. The conductor 200, however, may be positioned before the positive diode 208 at 212, above the negative diode 210 at 214, or between the negative diode 210 and a negative output terminal 216 at 218. In a three phase generator, such as the generator 100, an electrical potential across the conductor 200 is proportional to ⅓ of the total generator output current. The conductor 200 may be connected to any of the three phases, i.e., u, v, and w to determine a corresponding electrical current through the phase and due to symmetry, the total generator output current is three times the electrical current through the one phase. According to one embodiment, one conductor, such as the conductor 200, may be used for each phase and the total generator output current is the sum of the electrical current through individual phases.

A control device, discussed in more details below, can be used in combination with the generator 100 to measure the total generator output current. The control device may use the measurement to control the output power of the generator 100. Furthermore, since the geometric shape, hence the diameter and length, of the conductor 200 is maintained constant in the manufacturing process, the constant of proportionality, used to transform voltage drop across the conductor 200 to electrical current, also remains constant. Consequently, a control device may be used for all the generators manufactured accordingly. Any temperature variation of the conductor 200 can also be taken into account utilizing any of the sensors discussed above. The voltage drop across the length of the conductor 200 comprises a time varying function where a DC component of such waveform can be used to calculate the total generator output current.

Figure 3:
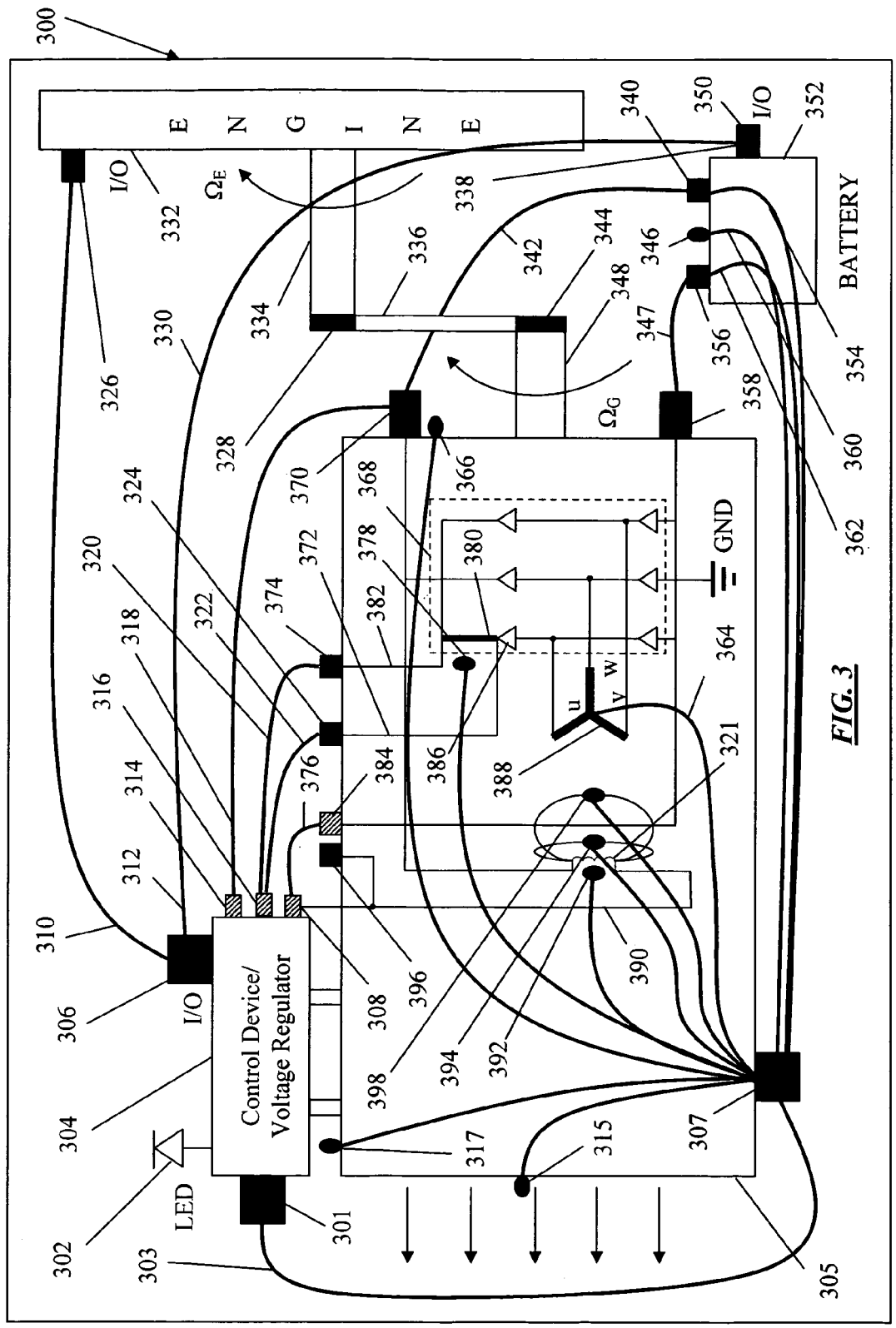
FIG. 3 shows a schematic diagram of a vehicle electrical system including a control device and a generator having a conductor of the type shown in FIG. 2A according to a preferred embodiment.

FIG. 3 shows a schematic diagram of a vehicle electrical system 300 including a control device 304 and a generator 305 having a conductor 380 of the type shown in FIG. 2A. However, the control device 304 may be used with the generator 305 that uses an ordinary conductor. According to a preferred embodiment, control device 304 also operates to regulate the output voltage of the generator 305. The control device 304 is used in combination with the generator 305 for improved monitoring, diagnostics, and control.

The generator 305 is coupled with and driven by an engine 332. A shaft 348 of the generator 305 is coupled with a shaft 334 of the engine 332 via a coupling 336 whereby a rotational speed of the engine $\Omega_E$ is imparted on the generator 305 causing it to rotate at an angular speed of $\Omega_G$. The vehicle electrical system 300 also comprises a battery 352 whose positive and negative terminals, 340 and 356, are connected to the generator's positive and negative terminals, 370 and 358, respectively.

The control device 304 comprises an I/O port 306 through which it exchanges system information with other components in the vehicle such as the engine 332 and battery 352 via their I/O ports 326 and 350, respectively. Such system information may comprise current through the conductor, conductor temperature, total generator output current, field current, field duty cycle, field coil temperature, engine and generator RPMs, battery type, battery temperature, generator output voltage, or the like. The control device 304 further comprises an LED 302 to provide visual signals as a means of communication.

The control device 304 further receives various signals from sensors positioned within the vehicle electrical system 300 or individual components. For instance, the control device 304 receives signals indicative of said system information from the generator 305 via terminals 301 and 307. The terminal 307 is connected with sensors 315, 317, 392, 394, 398, 378, and 366 to provide temperature, current, and resistance signals as discussed above (see FIG. 1). The terminal 307 is further connected with the battery 352 from which a negative output terminal 356, a positive output terminal 340, and a temperature sensor 346 provide negative output, positive output, and temperature of the battery 352 via lines 362, 354, and 360, respectively. The control device 304 is coupled with conductor 380 via terminals 316, 324, and 374 to measure the electrical potential across the conductor 380. The control device 304 is coupled with a field coil 321 of the generator 305 via terminals 308 and 384. The control device 304 is connected to the positive output terminal 370 and the negative output terminal 358 of the generator 305 via terminals 314 and 384, respectively.

The control device 304 uses a signal generated by the conductor 380 to measure a voltage drop through said conductor and correlating it with electrical current through the conductor 380. The control device 304 uses temperature signals from sensors 378, 315, 317, 392, and resistance signal from the sensor 394 to determine the conductor temperature. The conductor temperature is used to compensate for its temperature variations. Field current is measured directly using the current sensor 398 or indirectly from the duty cycle of the voltage across the field coil 321. This field current is taken into account when determining the total generator output current.

The control device 304 switches the negative side of the field coil 321 on/off as a means to control the total generator output current according to the voltage drop across the conductor 380. According to a preferred embodiment, the control device 304 further switches the negative side of the field coil 321 on/off to regulate the output voltage at a regulation voltage. Thus the control device 304 is capable of limiting and/or ceasing the output power of the generator 305 by switching on/off the field coil 321 in response to the output voltage and output current of the generator 305.

The control device 304 receives a signal indicative of the angular speed (RPM) $\Omega_E$ of the engine 332 via the engine I/O port 326 and measures the angular speed (RPM) $\Omega_G$ of the generator 305 from an AC component of the aforementioned waveform, known to skilled artisans, via a line 364 which is coupled to a phase of the generator 305. The control device 304 determines a ratio between the two RPMs and either limits the generator output power or generates an error signal, when the ratio differs from a predetermined value. Controlling the generator output power may correct temporary belt slippage that may have caused the mismatch. Any permanent defect with the coupling mechanism is broadcast to the vehicle electrical system via the I/O port 306 and/or the LED 302.

The control device 304 may further diagnose a fault condition that may exist in the field coil 321, phase windings 388, and rectifier assembly 368. This is achieved by obtaining a first and second value of the total electrical output of the generator 305 and generating an error signal when a difference between the values is above a predetermined value.

Figure 4:
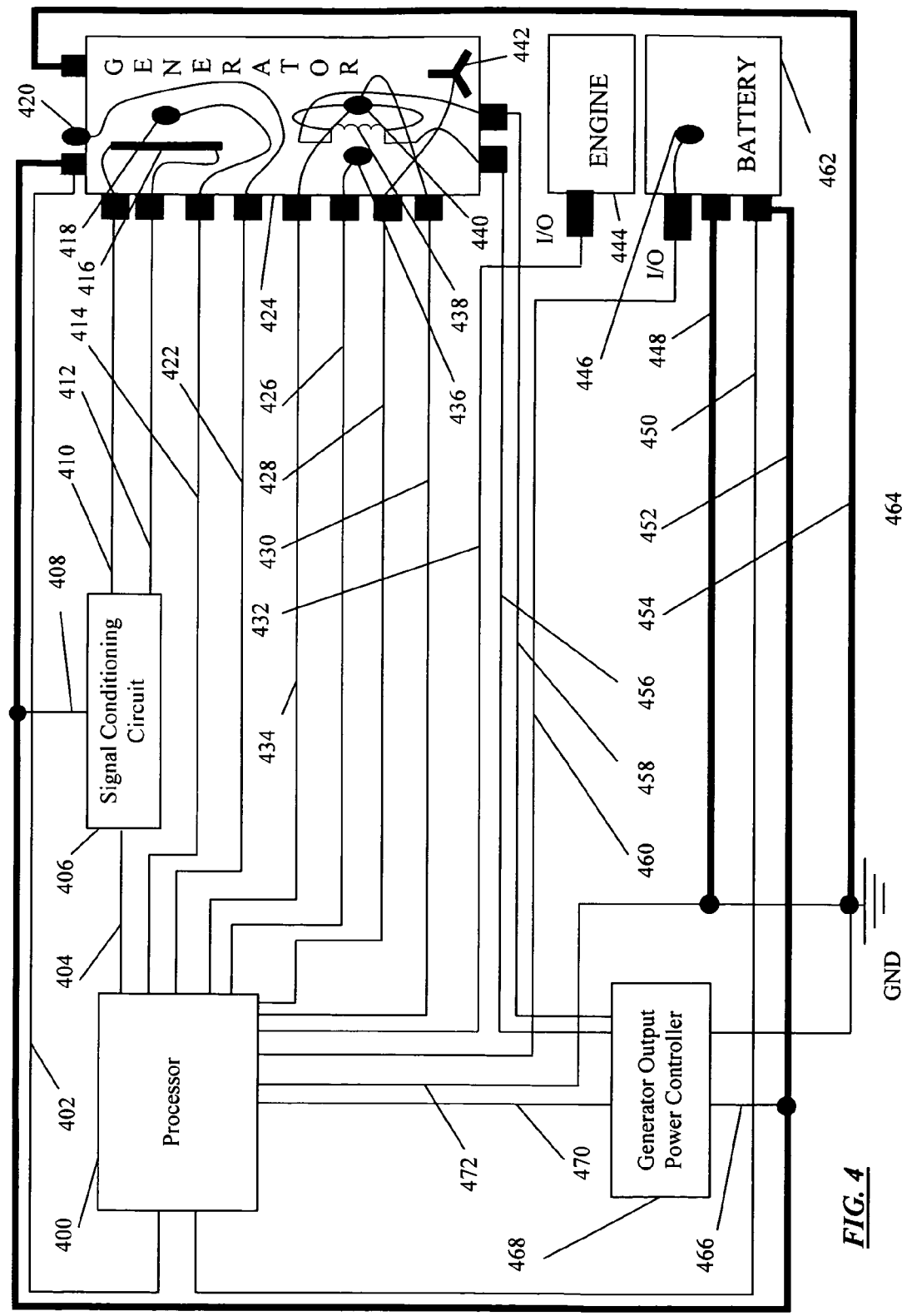
FIG. 4 is a schematic diagram of a processor included in the control device of FIG. 3 and its connections to the various components within the vehicle electrical system according to a preferred embodiment.

FIG. 4 is a schematic diagram of a processor 400 included in the control device of FIG. 3 and its connections to the various components within the vehicle electrical system according to a preferred embodiment. In one preferred embodiment, the processor 400 is a 68C08 processor available from Motorola, Inc. of Schaumburg, Ill. Programming code aboard the internal memory of the processor 400 is executed to perform, in part, the functions of the control device 304, as discussed fully below.

The processor 400 is coupled to a generator 424 as shown. Lines 410 and 412 provide signals from a conductor 416 to a signal conditioning circuit 406 that generates a signal, on line 404, indicative of an electrical potential across the conductor 416. Processor 400 uses this voltage drop to compute a total output current of the generator 424. For instance, for a three phase generator, the total output current is three times the voltage drop multiplied by a constant of proportionality.

A line 414 is coupled to a sensor 418 capable of generating a signal indicative of the conductor temperature. Processor 400 uses this signal to measure, directly, the conductor temperature and modify the total generator output current for any temperature variation of the conductor 416. A line 426 is coupled with a sensor 436 that generates a signal indicative of the temperature of the field coil 438. A line 430 is coupled with a sensor 440 that generates a signal indicative of the resistance of the field coil 438. The Processor 400 uses these signals to measure, indirectly or by inference, the temperature of the conductor 416. As discussed above, indirect measurement of the conductor temperature may be performed by receiving signals from sensors positioned in other locations such as in or around the control device or generator exhaust air. A line 422 is coupled to a sensor 420 capable of generating a signal indicative of a temperature of an output terminal of the generator 424. The processor 400 uses this signal to control the total generator output current.

The processor 400 compensates for the field current through the field coil 438 either directly from a sensor (see FIG. 3, sensor 166) capable of generating a signal indicative of said field current, or indirectly from a duty cycle of the waveform detected from the line 456 or applied to via the line 470. Indirect determination of the field current may be performed according to a mathematical/empirical equation or a look-up-table programmed into the processor 400.

Lines 456 and 458 are coupled to the positive and negative side of the field coil 438. According to one embodiment, a generator output power controller 468, such as a voltage regulator, is coupled to the lines 456 and 458 wherein an output voltage of the generator 424 is regulated at a regulation voltage by switching on/off the field coil 438 according to a waveform (see, e.g., Jabaji, U.S. Pat. No. 5,907,233). The processor 400 uses a line 470 to control the total generator output current by controlling the switching of the field coil 438 via the generator output power controller 468.

According to one embodiment, the processor 400 extracts a DC component form the signal on the line 404 and limits the total electrical output current generated by the generator 424 when the DC component is greater than $V_1$ and less than $V_2$ and ceases it when the DC component is equal to or greater than $V_2$, wherein $V_1$ and $V_2$ are predetermined values. As discussed above, in an alternative embodiment, the control device may itself operate as a voltage regulator wherein the processor 400 controls the waveform through the field coil 438 according to both the output voltage and the total electrical output current of the generator 424.

Where the control device 304 operates to regulate the output voltage of the generator 424, a line 460 is used to couple the processor 400 to an I/O port of a battery 462. Battery parameters such as temperature, type, voltage, or the like, may be communicated to the processor via the I/O port. The processor 400 may modify the regulation voltage according to the battery temperature, type, and voltage. The processor 400 may further be configured to use a default value when the battery temperature is outside of a predetermined range, say −25° C. to 125° C., or when a difference between the battery voltage and generator output voltage is above a predetermined value, say 30%.

The processor 400 is also coupled with a phase 442 of the generator 424 via a line 428 to measure a frequency of the phase which is related to the RPM of the generator 424. A line 432 couples the processor 400 to an I/O port of an engine 444 where the processor 400 may receive, among others, an engine RPM. The processor determines a ratio of the RPMs and may control the generator output power and/or generate an error signal, when the ratio differs from a predetermined value.

The processor 400 may utilize the information obtained as described above to further monitor the generator 424 and diagnose any fault condition of the field coil, stator, and rectifier diode assembly. In particular, the processor 400 may calculate two values for the generator output current and generate an error signal when the difference between the values are greater than a predetermined value. The first output current is obtained from the voltage drop across the conductor 416, its temperature from the line 414, and field current from a duty cycle of the waveform on the line 456. The second output current is determined from the field coil temperature on line 426, field current from the line 456, and generator RPM from the line 428.

Utilizing the system 300 described in FIG. 3, one embodiment of the operation of the control device 304 is now described. The control device 304 operates to control the total electrical output current generated by the generator 305. According to this embodiment, the control device 304 further operates to regulate the generator's output voltage, thus controlling the output power of the generator 305. The generator 305 is a brushless alternator having a field coil 321 as an output power controller, available from C.E. Niehoff & Co. of Evanston, Ill. The generator 305 is coupled with and driven by the engine 332 via the coupling 336, such as one or more drive belts. The generator 305 is further coupled with the battery 352 via negative and positive output terminals 370, 358, 340, and 356, where the former charges the latter when the engine 332 is operating. The control device 304 is further in communication with the engine 332 and battery 352 via their respective I/O ports 306, 326, and 350, where system information can be exchanged between the system components. The generator 305 is further coupled with the battery 352 via the terminal 307 where battery voltage and temperature can be read. The battery voltage is detected so that excessive voltage drops across cables 342 and 347 can be compensated for. The control device 204 receives a myriad of signals from the terminal 307, 384, 324, and 374 as discussed above.

The control device 304 monitors the voltage drop across the conductor 380 to determine the generator's total output current. The control device 304 further regulates the generator's output voltage via the field coil 321. When the generator's output current exceeds one or more threshold values, the control device 304 limits or ceases the output current by applying a phase modulated or step signal to the field coil 321 as described in more details below. The control device further takes into account any temperature variation of the conductor 380 and electrical current through the field coil 321 when determining the total generator output current. Thus in one instance the control device 304, via the processor 400, calculates a total generator output current according to $I_1=F(V_C, T_C, I_F)$, where $I_1$, $V_C$, $T_C$ and $I_F$ are the total generator output current, the voltage drop across the conductor 380, temperature across said conductor, and field current through the field coil 321, respectively. The functional form $F(V_C, T_C, I_F)$ can be determined either using a mathematical/empirical equation or through a look-up-table, known to skilled artisans.

As discussed above, the control device 304 further controls the generator's output power with respect to the engine and generator RPM. When a ratio between the two RPM is substantially differs from a predetermined value, the control device limits or ceases the generator output current, and/or broadcasts an error condition. The control device 304 further generates an error condition when there is a fault with either the field coil, or stator windings, or rectifier diode assembly. This is achieved by computing a second value for the total generator output current according to $I_2=F(\Omega_G, T_F, I_F)$, where $I_2$, $\Omega_G$, $T_F$ and $I_F$ are the second total generator output current, the generator RPM, temperature of the field coil 321, and electrical current through the field coil 321, respectively. The functional form $F(\Omega_G, T_F, I_F)$ can be obtained similarly as above. When there is a substantial difference between $I_1$ and $I_2$, the control device 304 broadcasts a fault condition to the vehicle electrical system.

The control device further operates to control the generator's output power by controlling its output voltage. The voltage regulation is based on switching on/off the field coil 321 according to the generator's output voltage and a predetermined regulation voltage. The control device 304 may vary the regulation voltage according to battery type, temperature, and voltage.

Figure 5:
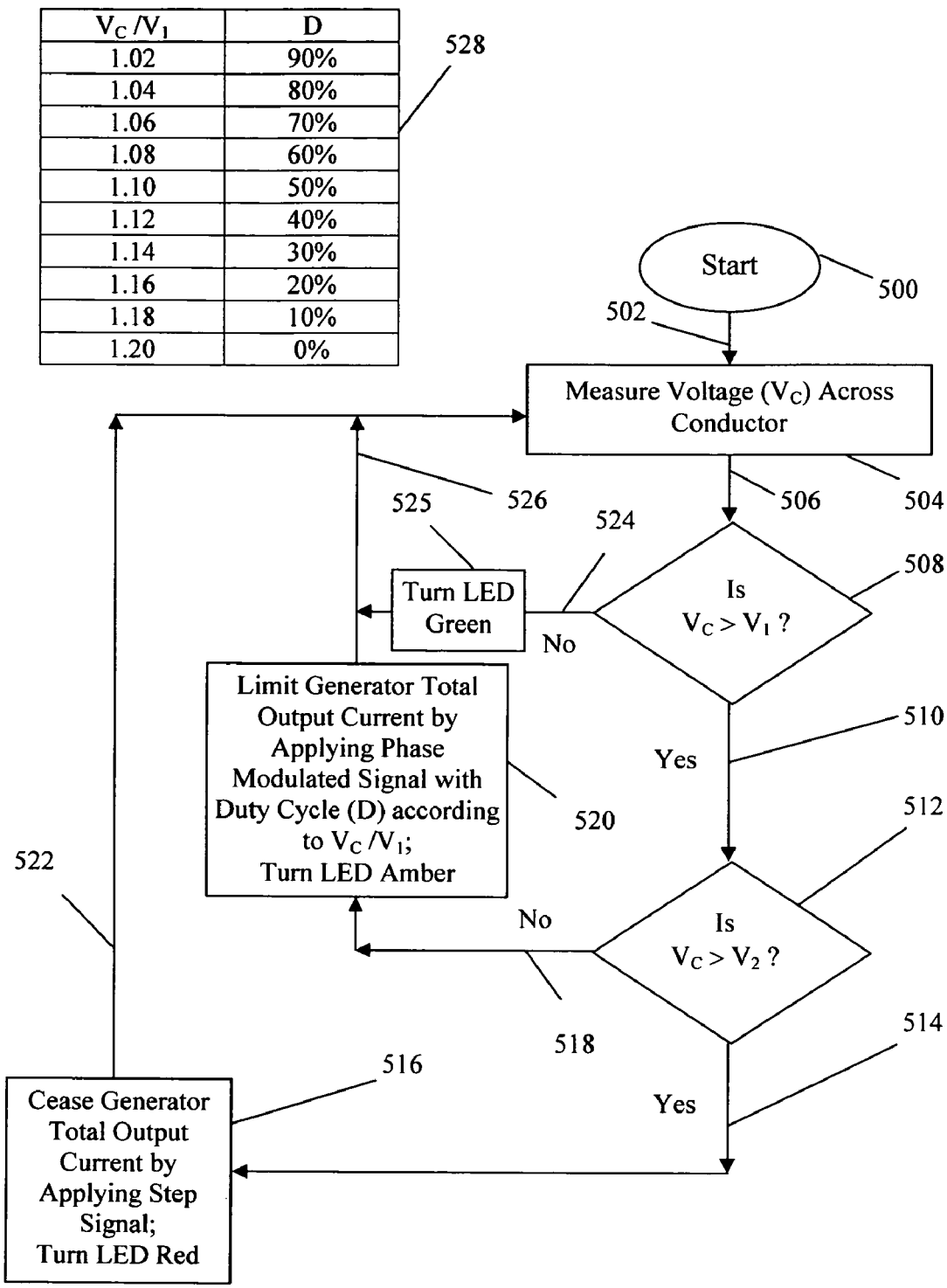
FIG. 5 is a flow diagram of one preferred method of operation of the vehicle electrical system of FIG. 3.

FIG. 5 is a flow diagram of one preferred method of operation of the vehicle electrical system of FIG. 3. Upon power up at 500, the processor 400 measures a voltage drop $V_C$ across the conductor 380 at 504. The voltage drop is compared with a predetermined voltage $V_1$ at 508. If the voltage drop $V_C$ is less than or equal to $V_1$ the processor is branched to at 524 to continue measuring the voltage drop across the conductor 380. If the voltage drop $V_C$ is greater than $V_1$ but less than or equal to $V_2$, the processor 400 is branched at 518 to limit the generator total output current by applying a phase modulated signal, at 520, with a duty Cycle (D) according to $V_C/V_1$ at 528.

Figure 6:
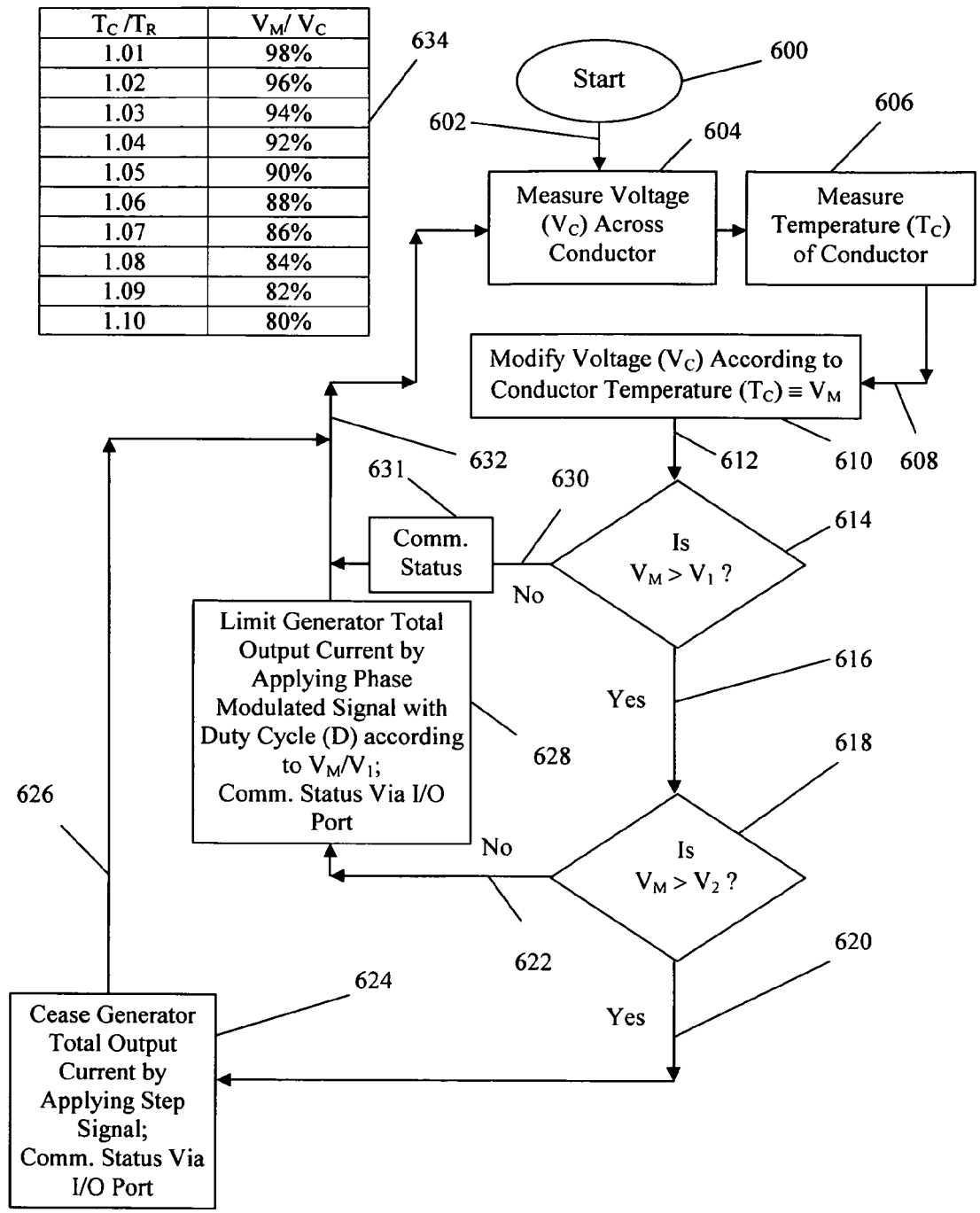
FIG. 6 is a flow diagram of one preferred method of operation of the vehicle electrical system of FIG. 3.

FIG. 6 depicts a preferred embodiment that adds to the method shown in FIG. 5 additional steps of measuring the temperature of the conductor 380 and modifying the voltage drop across it. Specifically, the processor 400 measures a conductor temperature $T_C$ at 606 and modifies the voltage drop $V_C$ at 610 to arrive at a modified voltage drop $V_M$ across the conductor 380. As mentioned above, any mathematical/empirical relation or look-up-table may be programmed in the processor 400 to perform this task. $V_M$, determined via a look-up-table at 634, is compared with $V_1$ and $V_2$ at 614 and 618, and a phase modulated or step signal is applied to limit or cease the generator output current at 628 and 624.

Figure 7:
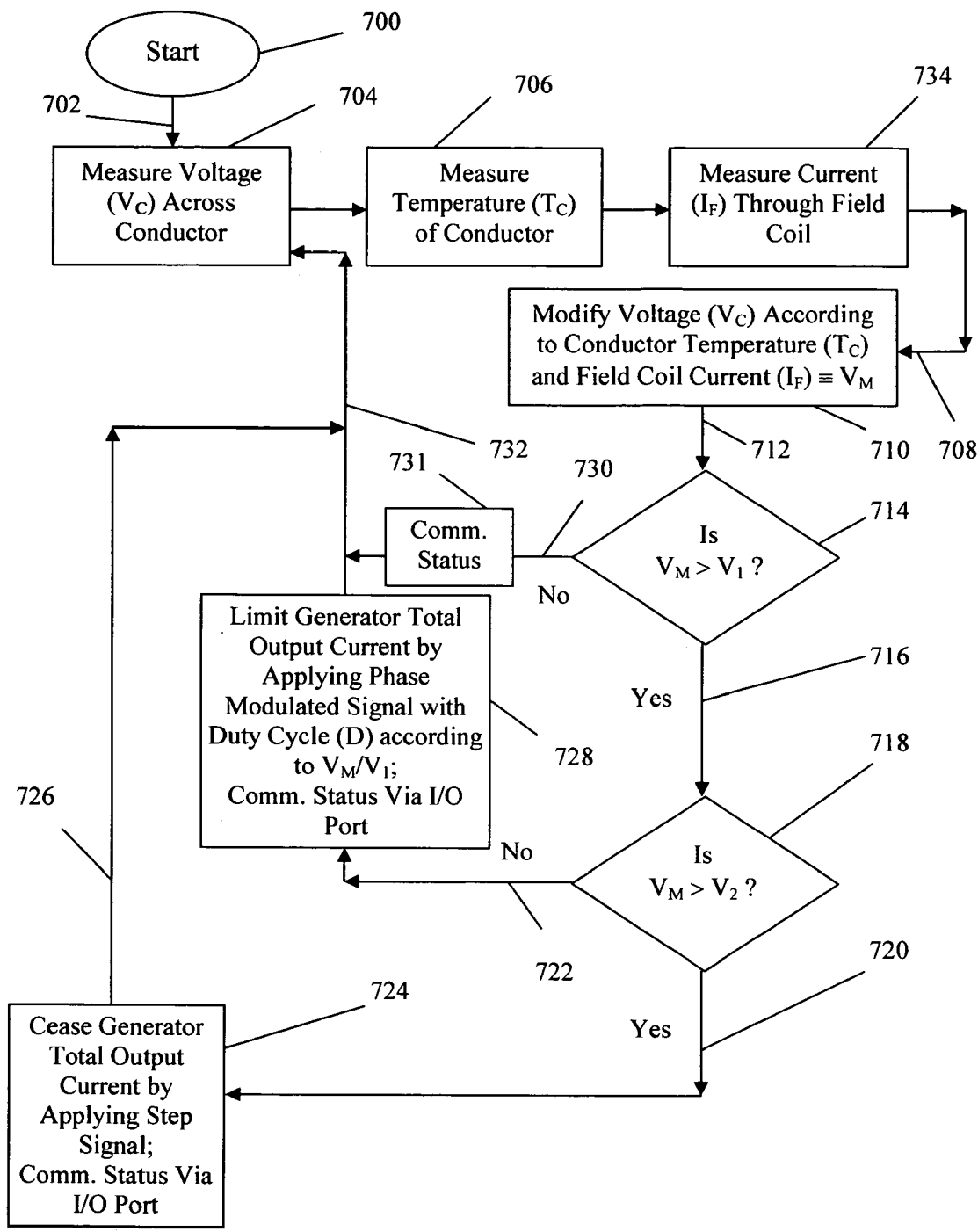
FIG. 7 is a flow diagram of one preferred method of operation of the vehicle electrical system of FIG. 3.

FIG. 7 depicts a preferred embodiment that adds to the method shown in FIG. 6 an additional step of measuring the field current at 734. $V_M$ is further modified according to the field current at 710.

Figure 8:
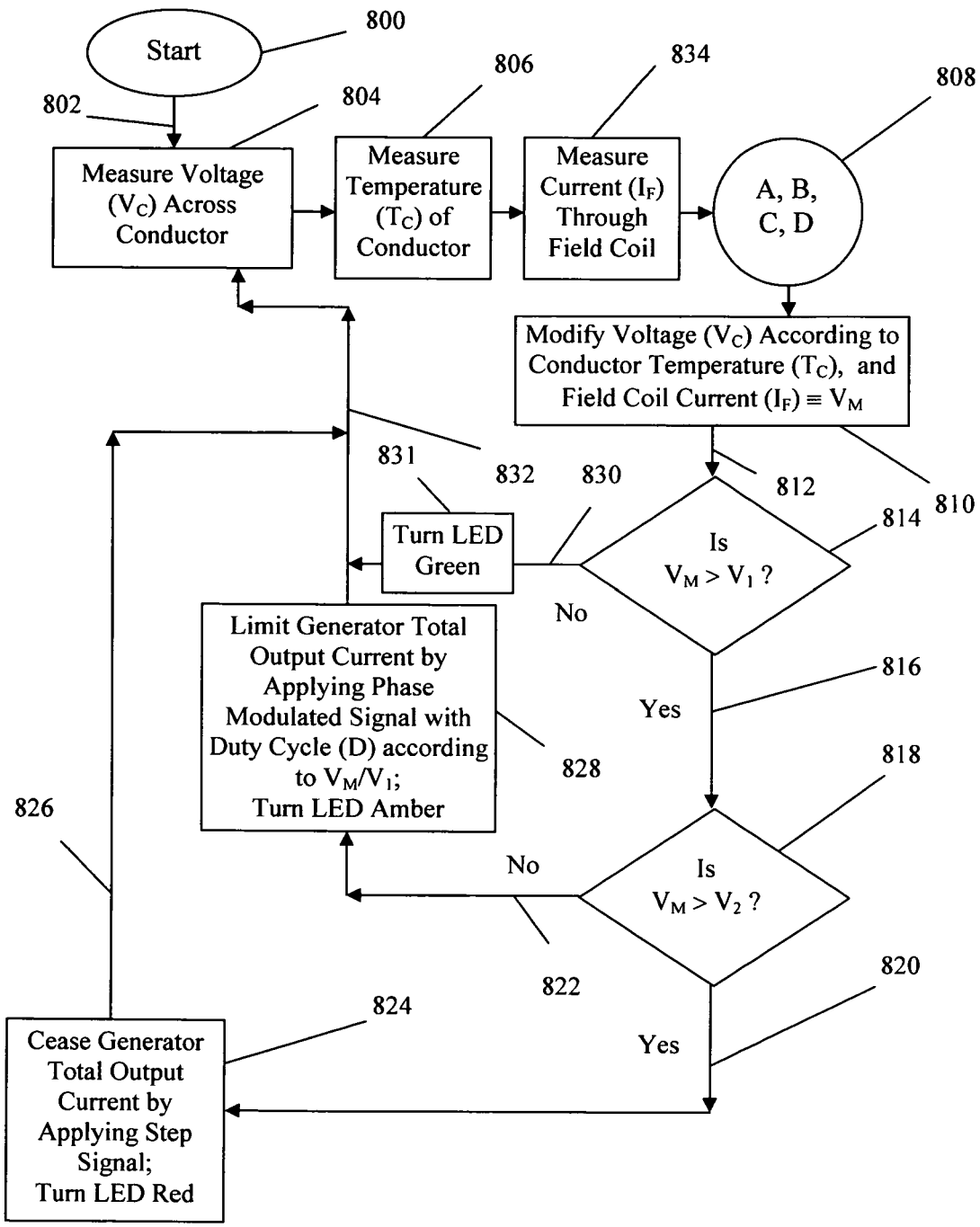
FIG. 8 is a flow diagram of one preferred method of operation of the vehicle electrical system of FIG. 3.

FIG. 8 is a flow diagram of one preferred method of operation of the vehicle electrical system of FIG. 3. According to this embodiment, four additional operations are performed at 808 where the processor 400 may be configured (programmed) to execute the operations either cyclically or by interrupt.

Figure 9:
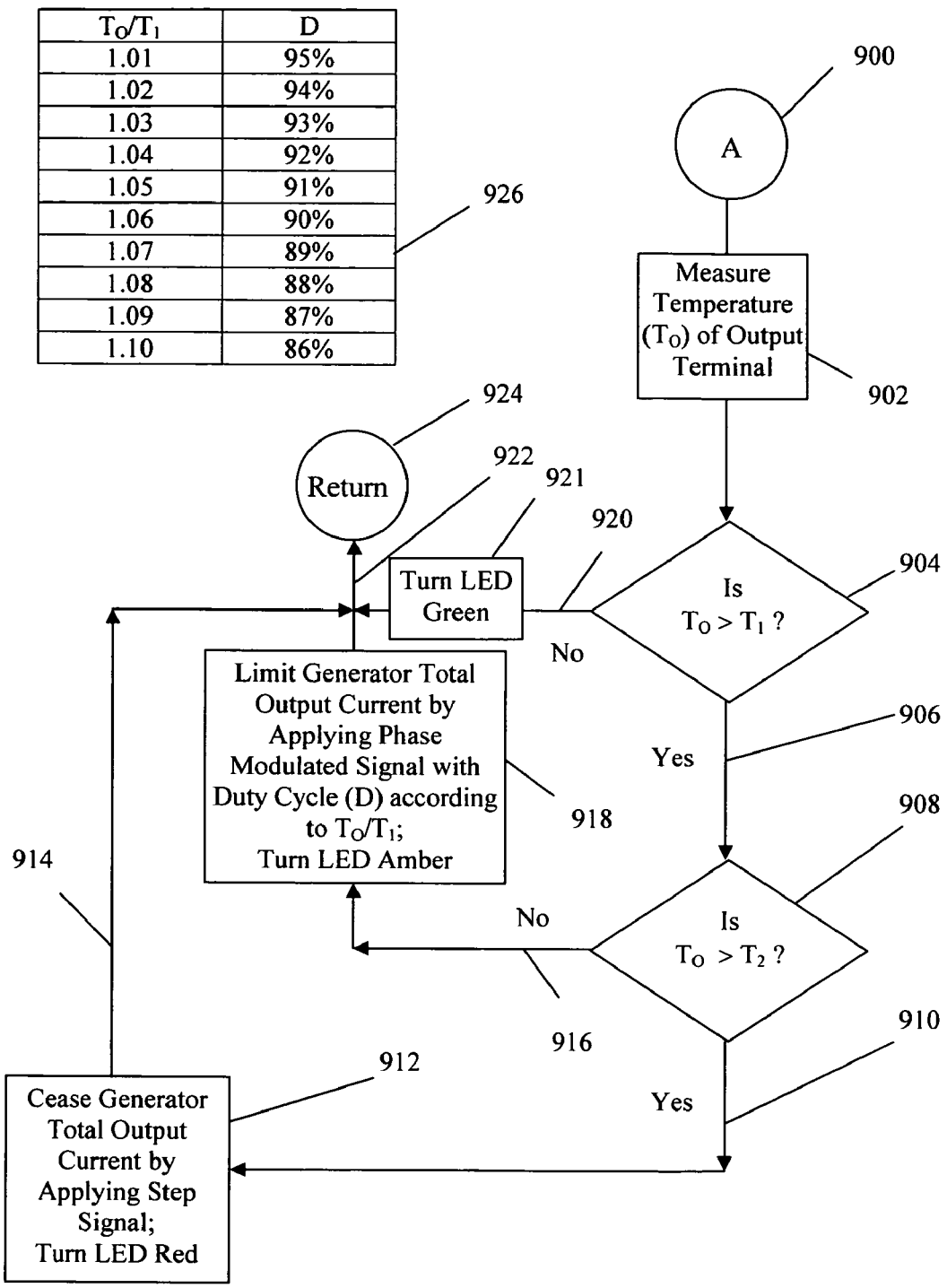
FIG. 9 is a flow diagram of one preferred method of operation of the vehicle electrical system of FIG. 3.

FIG. 9 is a flow diagram of one preferred method of operation of the vehicle electrical system of FIG. 3. The processor 400 measures an output temperature $T_O$ of the generator 305 at 902 which subsequently is compared with $T_1$ and $T_2$ at 904 and 908 to control the total generator output current at 912 and 918. The duty cycle of a phase modulated signal is varied according to a look-up-table at 926.

Figure 10:
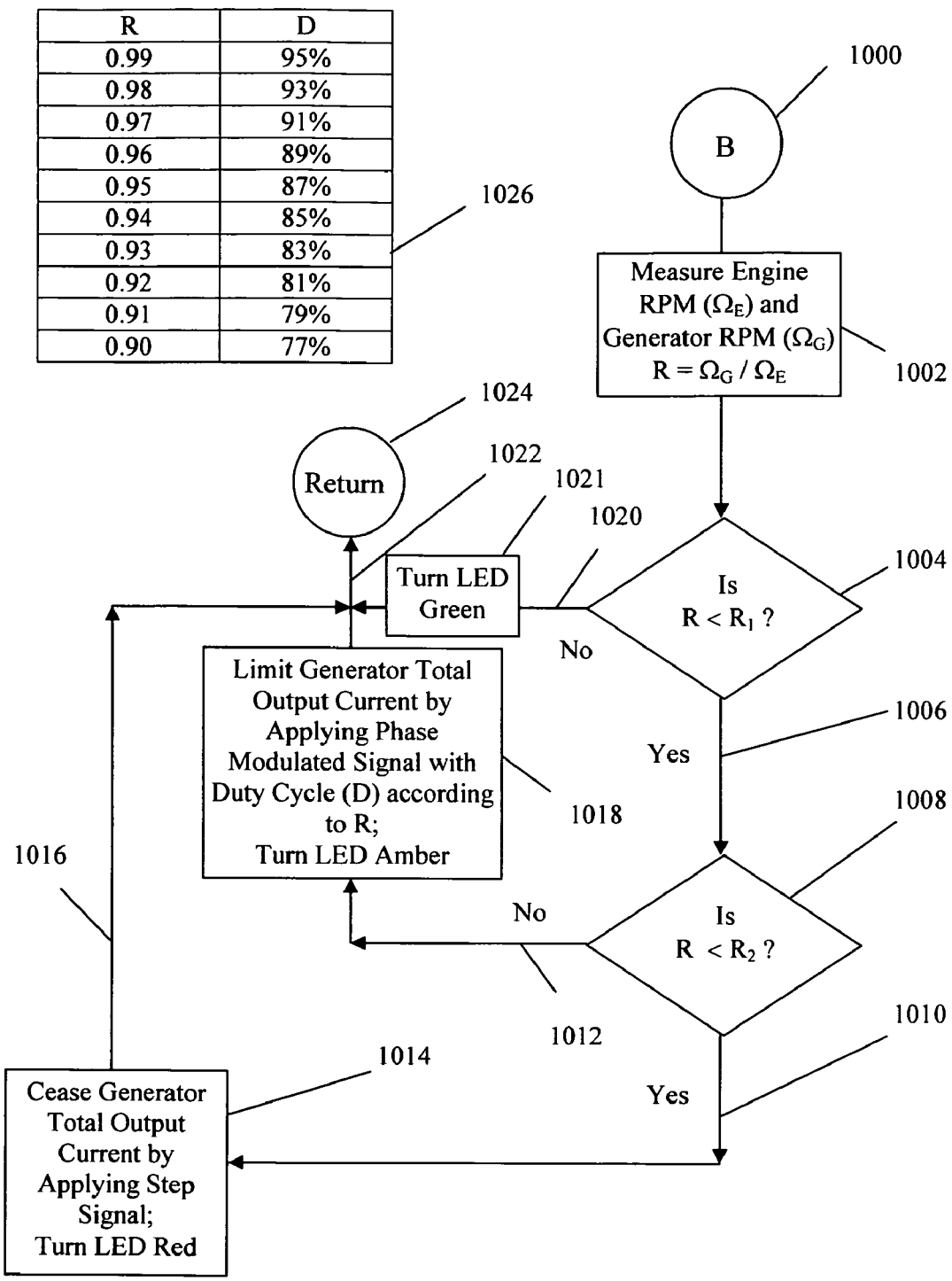
FIG. 10 is a flow diagram of one preferred method of operation of the vehicle electrical system of FIG. 3.

FIG. 10 is a flow diagram of one preferred method of operation of the vehicle electrical system of FIG. 3. According to this embodiment, the processor 400 measures an engine and generator RPM at 1002 and compares a ration R of the two RPMs at 1004 and 1008 with two predetermined values $R_1$ and $R_2$. The processor 400 applies a phase modulated or a step signal to limit or cease the generator output current at 1018 and 1014. Similar to above, a duty cycle can be chosen from a look-up-table at 1026. A ratio of the RPMs that is substantially different from a predetermined value signifies a malfunction in the coupling mechanism, such as the case when a drive belt slips on the pulley or when the belt is broken. As such, the processor 400 applies a control signal to the generator output power controller 468 to reduce or cease the total generator output current to lower the generator torque in an attempt to correct for the belt slippage.

Figure 11:
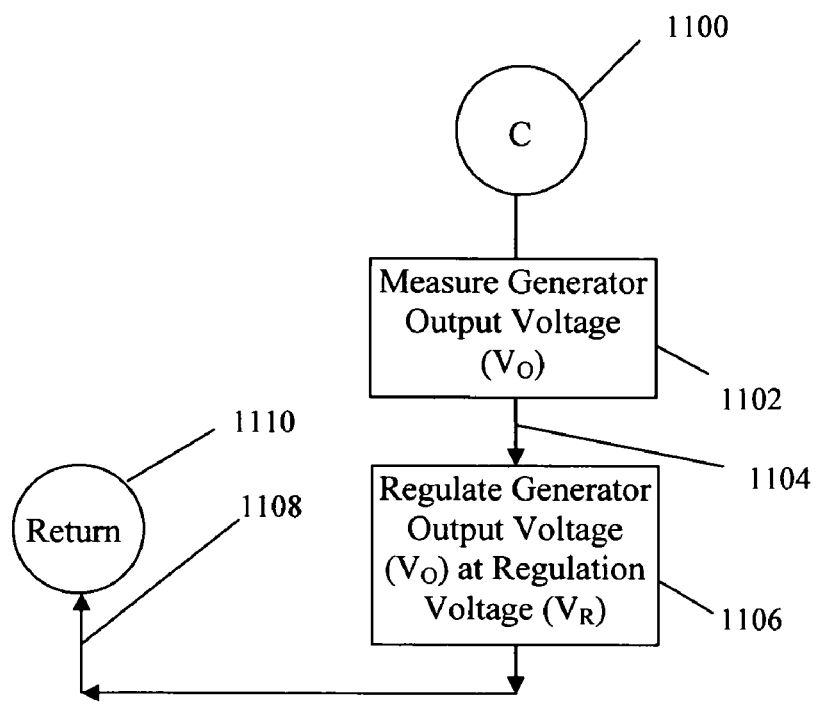
FIG. 11 is a flow diagram of one preferred method of operation of the vehicle electrical system of FIG. 3.

FIG. 11 is a flow diagram of one preferred method of operation of the vehicle electrical system of FIG. 3. As discussed above, the control device 304 may further operate as a voltage regulator in addition to controlling the generator output current. The voltage regulation may be performed by measuring the generator output voltage at 1102 and regulating the output at a regulation voltage at 1106, via the generator output power controller 468, as discussed above.

Figure 12:
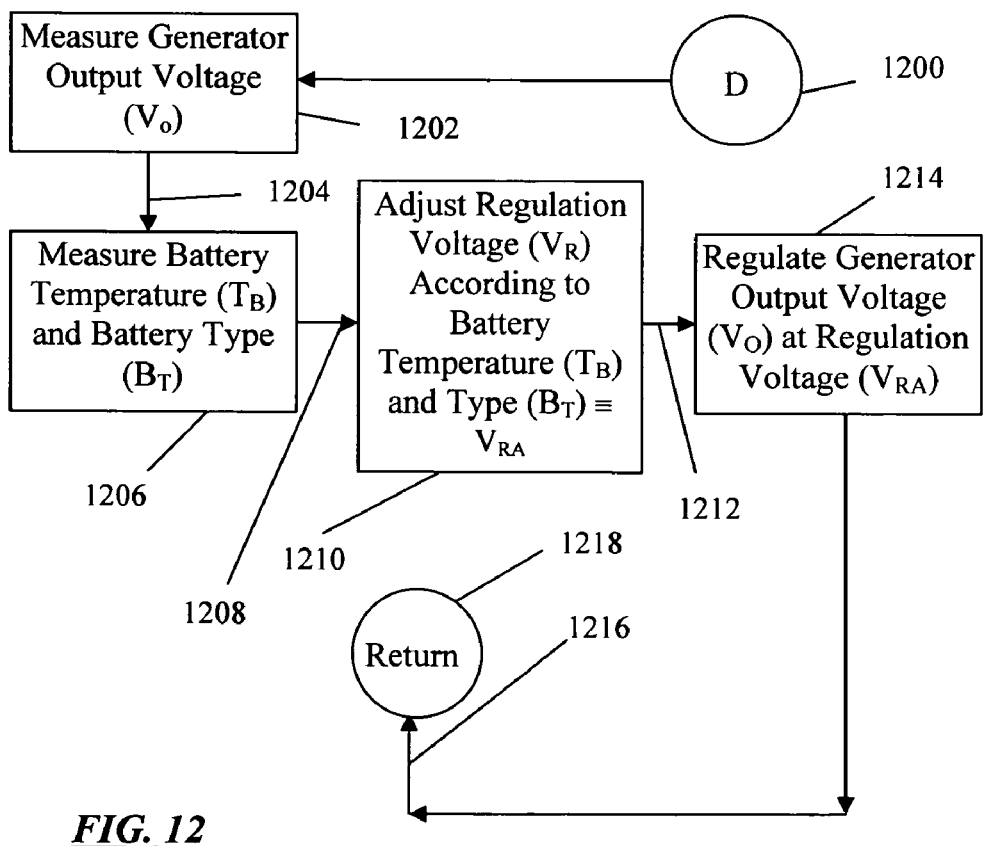
FIG. 12 is a flow diagram of one preferred method of operation of the vehicle electrical system of FIG. 3.

FIG. 12 is a flow diagram of one preferred method of operating the vehicle electrical system of FIG. 3, when the control device 304 further operates as a voltage regulator. This method of operation takes into account battery type and temperature at 1206, modifies the regulation voltage accordingly at 1210, and regulates the generator output voltage according to the modified regulation voltage at 124. This method ensures proper temperature compensation for different types of batteries.

Figure 13:
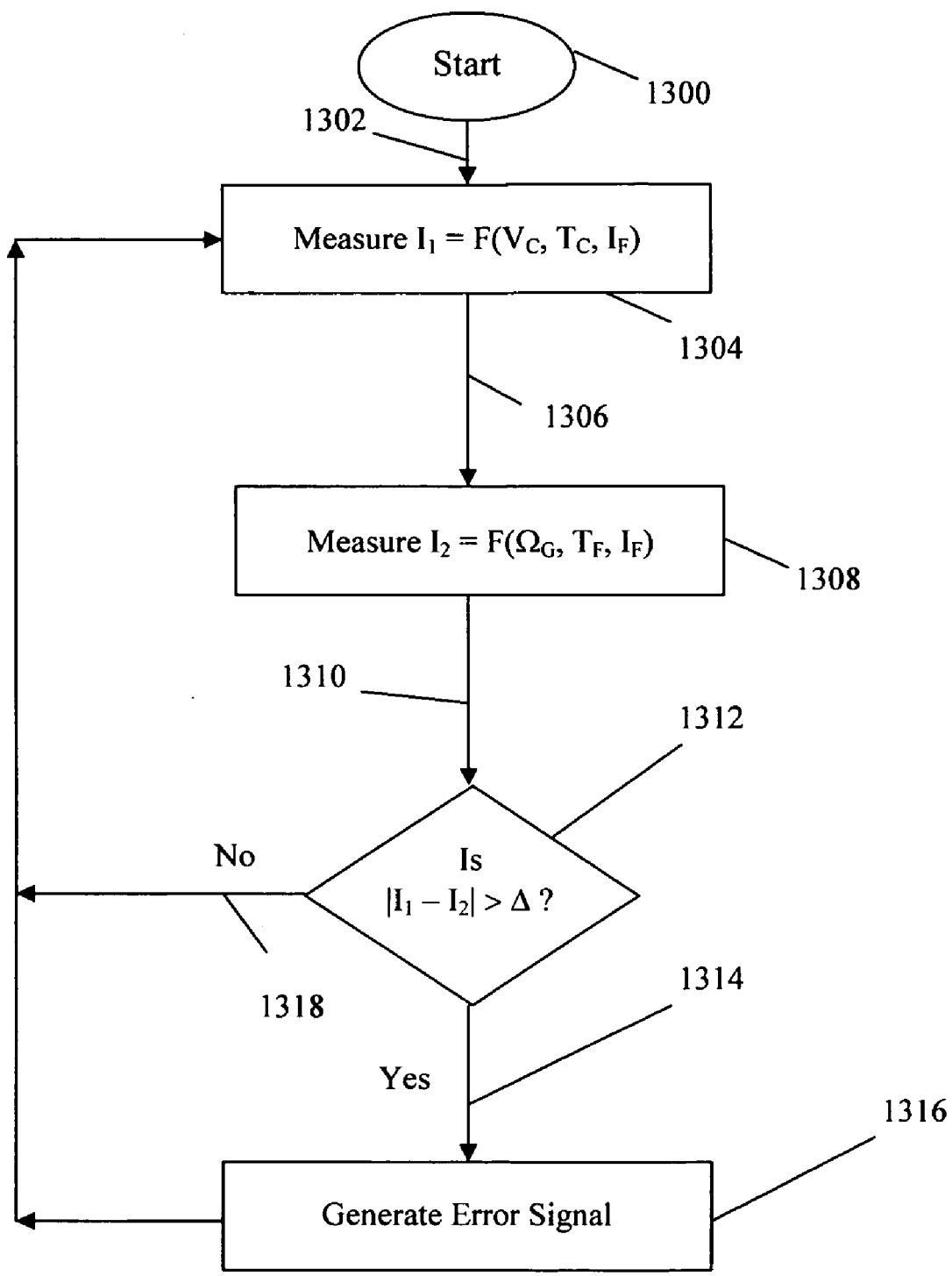
FIG. 13 is a flow diagram of one preferred method of operation of the vehicle electrical system of FIG. 3.

FIG. 13 is a flow diagram of one preferred method of operation of the vehicle electrical system of FIG. 3. This method is a diagnostic process whereby a fault in the field coil, stator windings, and rectifier diode assembly can be detected. As discussed above, the processor 400 may determine two values for the total generator output current. One value $I_1$ is obtained as a function of the voltage drop across the conductor 380, its temperature, and field current, at 1304. A second value $I_2$ is obtained as a function of generator RPM, Field temperature $T_F$ and field current $I_F$ at 1308. A difference between the two that is above a predetermined value signifies an error condition which is communicated at 1316.

The forgoing discloses a control device used in combination with a generator in a vehicle electrical system. The control device uses a conductor in the generator which may include a process-controlled geometric shape to measure the total electrical output current generated by the generator as a simple, economical, and efficient way to directly measure the generator's output current without the need for additional sensors. Other parameters are monitored in order to provide for an improved system of monitoring, diagnostics and control of the generator and the vehicle electrical system.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A generator, comprising:
   a conductor comprising
   a process-controlled geometric shape and operative to generate
   a first signal indicative of
   an electrical potential across the conductor and wherein
   a total electrical output current generated by the generator is substantially proportional to the electrical potential,
   wherein the process-controlled geometric shape comprised at least one of a specific length and a specific cross section,
   wherein the specific length is a specified dimension comprising a tolerance range of less than or equal to 1/100 of an inch.

2. The generator of claim 1, further comprising a control device responsive to the first signal and operative to at least one of limit and cease the total electrical output current, via a generator output power controller, according to the first signal.

3. The control device of claim 2, wherein said generator output power controller comprises at least one of a voltage regulator, a field coil, a silicon controlled rectifier, and a metal oxide semiconductor field effect transistor.

4. The generator of claim 2, further comprising means to generate a second signal indicative of a temperature of the conductor and wherein the control device is additionally responsive to the second signal and operative to at least one of limit and cease the total electrical output current, via the generator output power controller, according to at least one of the first and second signal.

5. The generator of claim 2, further comprising means to generate a second signal indicative of electrical current through a field coil included in the generator and wherein the control device is additionally responsive to the second signal and operative to at least one of limit and cease the total electrical output current, via the generator output power controller, according to at least one of the first and second signal.

6. The generator of claim 1, wherein the specific cross section is one of a circular, a rectangular of a trapezoidal cross-section.

* * * * *